Patented Nov. 1, 1938

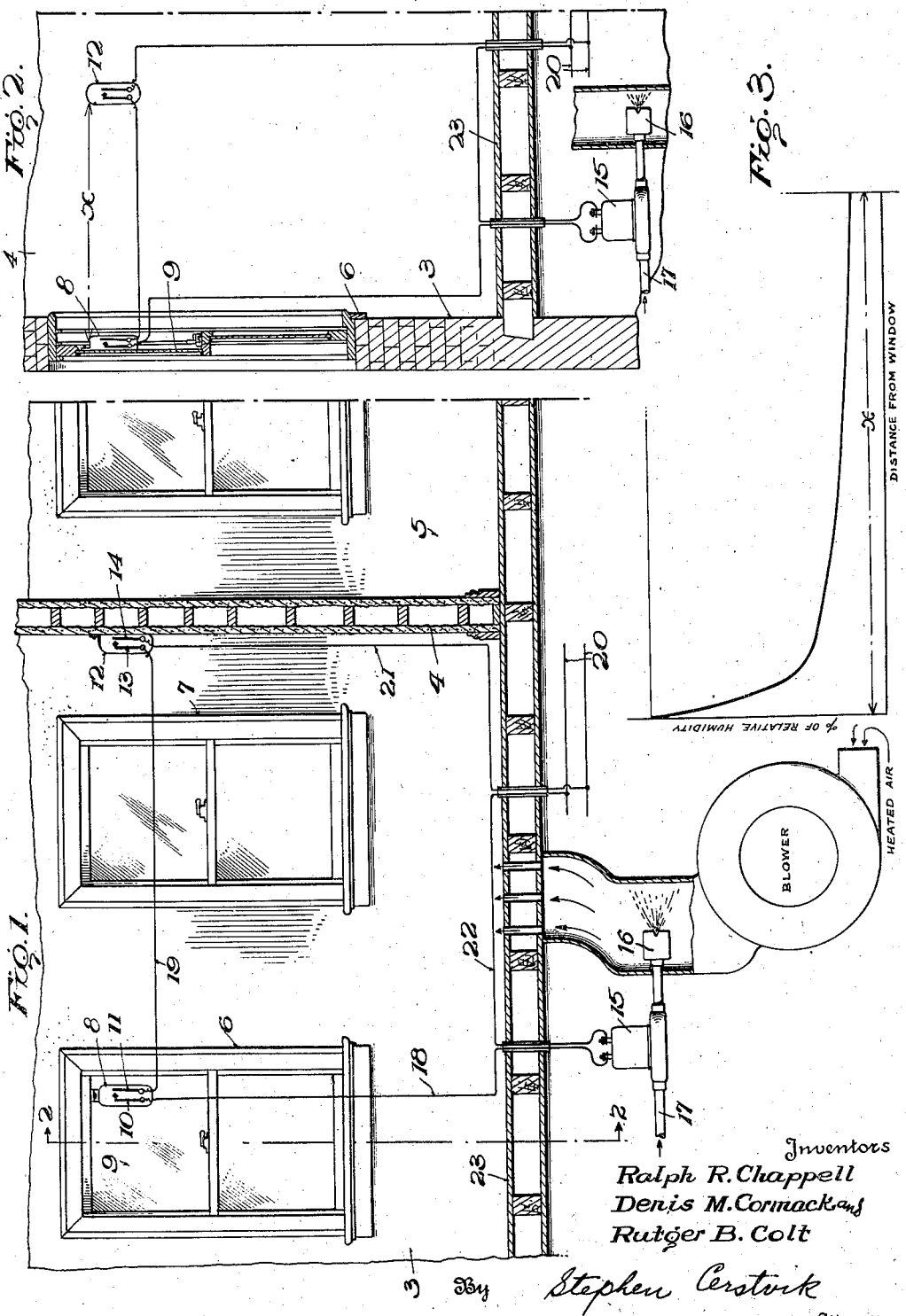

2,135,101

UNITED STATES PATENT OFFICE 2,135,101

AIR CONDITIONING SYSTEM

Ralph R. Chappell, Richmond, Va., and Denis McCormack and Rutger B. Colt, Baltimore, Md., assignors to Bendix Aviation Corporation, South Bend, Ind., a corporation of Delaware Application September 9, 1935, Serial No. 39,858

4 Claims. (Cl. 236—44)

The present invention relates to an air-conditioning system and more particularly to means for controlling humidity in an enclosure such, for example, as a room or building.

One of the objects of the invention is to provide novel means for controlling relative humidity in an enclosure in accordance with relative changes between the temperature inside of the enclosure and outside of the enclosure to prevent condensation of moisture on the surfaces of the enclosure, particularly on those surfaces, such as windows, which are mostly exposed to outside temperature.

It has been found that under normal outdoor temperature conditions, as in the summer time when a building is not heated, a normally fixed or constant relative humidity generally exists in a building, room or other enclosed space, but during times when outdoor temperatures are lower than indoor temperatures, as in winter when a building is heated, the relative humidity increases nearer the walls or windows which themselves have a much lower temperature.

Not only is this increased relative humidity evident right against the actual chilled window or other surface, but the increase in relative humidity begins to take place, under ordinary room conditions, at an appreciable distance from the chilled surface. For example, during a test taken when the outdoor temperature was 20° F. and the indoor temperature was 72° F. in a room where no fans were running, the relative humidity, which was 49% in the room generally, began to increase noticeably at a distance as far as 15" from the chilled window; at this distance the relative humidity was 52%; at an 8" distance from the window the relative humidity was 55%; at 4", 59%; at ½", 82%; and on the window itself condensation took place thus showing a condition of 100% relative humidity.

Where it is desired to introduce humidity in buildings, rooms or in closed spaces for industrial, health or comfort purposes, one of the main difficulties is that during winter when the windows, outside walls, etc., are chilled, condensation occurs on these chilled surfaces and such condensation or sweating is undesirable because it may cause considerable inconvenience and even damage. This condensation may also take place on shipboard where the loss of heat from the hull of the ship into cooler water results in the surfaces being colder than the inside air, or in industrial establishments where some other reason exists for certain surfaces being colder than the general room condition.

Accordingly, another object of the invention is to provide novel means for controlling relative humidity in an enclosure to prevent condensation of moisture on the surface of the enclosure due to a lower temperature existing outside of the enclosure than that existing inside of the enclosure.

Still another object is to provide, in an air conditioning system including a humidity regulator, novel means whereby said regulator is rendered inoperative when a surface in the enclosure which is air conditioned becomes chilled due to lower temperature outside of the enclosure and condensation begins to take place due to such chilling.

A still further object of the invention is to provide, in an air conditioning system including a humidifier and humidity regulator adapted to control the humidifier to maintain a desired relative humidity in an enclosure, a novel combination including a second humidity regulator set to control the humidifier at a higher relative humidity than the first regulator and so located in the enclosure and so connected with and related to said first regulator that the latter is rendered inoperative when a surface in the enclosure becomes chilled and condensation is about to take place thereon, whereby such condensation is substantially prevented.

The above and other objects and advantages of the invention will appear more fully hereinafter from a consideration of the following description, together with the accompanying drawing wherein one embodiment of the invention is illustrated. It is to be expressly understood, however, that the drawing is for the purposes of illustration and description only and is not to be construed as defining the limits of the invention, reference being had for this purpose to the appended claims.

In the drawing wherein like reference characters refer to like parts in the two views:

Fig. 1 is a partial view, in sectional elevation, of a room showing one way in which the invention may be carried out;

Fig. 2 is a sectional view of the room taken on line 2—2 of Fig. 1; and

Fig. 3 is a graph showing how relative humidity increases as the distance from the chilled surface decreases.

The system of the invention comprises, broadly, two humidostats or automatic humidity regulators which may be of any well known type, preferably like that disclosed in Patent No. 1,998,340, dated April 16, 1935, for controlling humidifying apparatus to supply humidified air into a room or building for the purpose of maintaining the relative humidity at a constant desired value. One of the humidostats is located in the normal position in the room, i. e., in a position where the relative humidity is average for a desired normal value, and the other is located in proximity to or against the chilled surface, such as a window. The two humidostats or controllers are connected to operate in series relation either electrically, pneumatically, hydraulically or in any other suitable manner and are so set for regulation that when the chilled surfaces to be protected from condensation are at temperatures not appreciably lower than the general room temperature, the humidostat located in the main body of the room controls the humidity conditions of the room to maintain the desired relative humidity, but should the surfaces to be protected from condensation become chilled later for any reason, as when the outdoor temperature drops, the second humidity controller located in proximity to or against the chilled surface takes control of the humidity regulation by virtue of the fact that said controller is rendered effective at a time earlier than the room humidostat due to the rise in relative humidity that takes place nearer the chilled surface. The humidostat which is located in the main body of the room will be hereinafter referred to as the "room" humidostat and the second humidostat which is located in proximity to or against the chilled surface, such as a window, will be referred to as the "window" humidostat.

As an example, if it be desired to maintain a condition of comfort in a room or dwelling, the room humidostat might be set to control humidity conditions in the room to maintain the relative humidity in the room substantially constant at approximately 50%, i. e., it would be set to maintain the humidifier in operation until the relative humidity reached 50%, and thereupon it would render the humidifier inoperative. On the other hand, the window humidostat would be set to control the humidifier at an appreciably higher percentage of relative humidity as, for example, at 80%, i. e., the window humidostat would tend to continue to operate the humidifier until the relative humidity at or near this humidostat reached 80% and thereupon it would render the humidifier inoperative. Since, however, the two humidostats are connected in series, neither one can control the humidifier unless and until the other is in operating position, and then each is in operating position until the relative humidities at their respective locations reach the values for which the humidostats have been set and are immediately rendered inoperative when each reaches its respective set value. Thus, while the protected surfaces remain at temperatures substantially the same as room temperature, as in the summer time when the outdoor temperature is substantially the same as the indoor temperature, the surfaces would not be chilled and, hence, the relative humidity in proximity to the protected surface would remain substantially the same as the average relative humidity in the room. Therefore, since the window humidostat is set for a point of control higher than the average desired relative humidity, it would remain in an operative position and its connection with the room humidostat would remain completed so that the room humidostat could perform its function of maintaining the relative humidity constant at 50%. In other words, as long as the temperature of the protected surfaces is the same as the room temperature the relative humidity at or near the surfaces will be at or near the same relative humidity as is in the room and, hence, the window humidostat will always remain in an operating position because it cannot be actuated into an inoperative position unless the relative humidity in its vicinity reaches the higher relative humidity for which said window humidostat has been set, but under these conditions the higher humidity does not occur because the room humidostat maintains the average relative humidity at 50%.

As the temperature of the protected surfaces begins to fall, an increase in the relative humidity of the air near the protected surfaces takes place. Some increase in relative humidity in proximity to the protected surface is ordinarily permissible. In fact, it is not until the chilling of the protected surface is sufficient to so chill the air adjacent thereto as to cause the percentage of relative humidity on the actual surface to rise to 100% and, thus, cause condensation or sweating, that protection is required. Therefore, as soon as the outdoor temperature drops to such an extent as to so chill the surfaces that the relative humidity at or adjacent to the surfaces would increase to approximately 80%, the window humidostat will be immediately actuated into inoperative position, thereby breaking its series connection with the room humidostat and rendering the humidifier inoperative, thus cutting down the supply of moisture to the room and, hence, preventing condensation from taking place on the chilled surfaces.

The invention consists substantially in the combination, location and relative arrangement of the parts of the novel system, for obtaining the results desired in accordance with the herein defined objects, as will be more fully hereinafter set forth in the description of the drawing, as shown in said drawing by way of example, and as finally pointed out in the claims.

Referring now to the drawing and more particularly to Fig. 1, there is shown a corner of a room formed by an outside wall 3 and an inside wall 4 which separates said room from an adjoining room 5. The outside wall 3 is provided with windows 6 and 7. Since the wall 3 is an outside wall, it is much colder than the inside wall 4 when the outdoor temperatures are below normal as in the winter time. Hence, as previously explained, the wall 3 and the windows 6 and 7 would sweat, i. e., have condensation formed thereon even though the relative humidity in the room would be approximately 50%. In order to prevent such sweating, a humidostat 8 is secured to the window 6 in close proximity to or against a window pane 9. This humidostat 8 constitutes the window humidostat and is set for a relative humidity of approximately 80% and is of the electrical type having, in the present instance, a pair of relatively movable contacts 10 and 11 which remain closed until the relative humidity reaches the value for which the humidostat has been set. Another humidostat 12 is secured to the wall 4 and at a distance $x$ (Fig. 2) from the outside wall 3, the distance $x$ being greater than the maximum distance at which the relative humidity begins to increase as the wall 3 or windows 6 and 7 are approached. The distance $x$ is determined in the manner shown by the graph or curve in Fig. 3. The humidostat 12 is of substantially the same type as the humidostat 8 and is provided with relatively movable electrical contacts 13 and 14 but is set for a relative humidity of approximately 50% or such humidity as it is desired to maintain in the room for comfort or other reasons. Contacts 13 and 14 will, therefore, remain closed until the average relative humidity in the room has reached 50%. Since the invention is not in the humidostats per se, the humidity responsive elements and the detail structure of the humidostats are not shown in the drawing and need not be described in detail.

In accordance with the invention, the humidostats 8 and 12, in the present embodiment, are connected in a series electrical circuit which includes a humidifier constituted by a solenoid valve shown generally at 15, said valve 15 controlling the supply of water supplied to a spraying device 16 from a supply pipe 17. Accordingly, one terminal of the humidostat 8 is connected to one terminal of the solenoid valve 15 by means of a lead 18 and the other terminal of the humidostat 8 is connected to one terminal of the humidostat 12 by means of the lead 19. The other terminal of the humidostat 12 is connected to one side of an electrical supply line 20 by means of a lead 21 while the other side of the supply line is connected to the other terminal of the solenoid valve 15 by means of a lead 22. Thus, when contacts 10—11 and contacts 13—14 are both closed, the circuit is completed and the solenoid valve 15 is operated to permit the passage of water from pipe 17 to the spraying device 16. If, however, either the contacts 10—11 or the contacts 13—14 are opened the solenoid valve 15 is closed and no water is supplied to the spraying device 16 from the supply pipe 17.

The humidifier, i. e., the spraying device 16 is preferably located in the basement for supplying water to the main air-conditioning equipment and is, therefore, shown as being below the floor 23 of the room. However, the humidifier may be part of a cabinet type air-conditioner which may be located in the room, without departing from the scope of the invention for the reason that the invention is primarily in the system by which the humidifier is controlled and not in the particular location thereof.

Thus, it will be seen that as long as the outdoor temperature is substantially the same as the temperature inside the room, the wall 3 and the windows 6 and 7 will not become chilled and, hence, the wall and windows will not sweat because under such conditions the relative humidity is the same at or on the wall 3 as the average humidity of the room. Consequently, the contacts 10—11 of the humidostat 8 will always remain closed as humidostat 8 is set for a high humidity and only the contacts 13—14 of the humidostat 12 will control the operation of the humidifier to maintain the relative humidity in the room at the value for which said humidostat 12 has been set, i. e., approximately 50%, if the room be that of a dwelling. For industrial purposes, as in the manufacture of textiles or in the treatment of tobacco when the enclosure would be a room in which a relative humidity other than that required for health or comfort conditions is desired to be maintained, the humidostat 12 would be set for this other relative humidity and the humidostat 8 would then be located on a surface which is exposed from the outside to chilling temperatures and would be set for a higher relative humidity than the humidostat 12 in order to prevent condensation on the chilling surface.

By suitable setting of the room humidostat 12 and the window humidostat 8, the desirable relative humidity can be maintained in the room until chilling of the wall 3 and windows 6 and 7 would cause danger of condensation. Before such condensation could take place, however, the window humidostat would take control away from the room humidostat and would thereafter maintain the highest possible humidity without condensation occurring no matter how much the temperature of the wall and windows might drop. In this manner and without manual control or human attention of any kind, the humidity is maintained in the room generally at the highest practical point.

There is thus provided a novel air-conditioning system and more particularly a system for controlling the relative humidity in an enclosure whereby condensation on surfaces of the enclosure is prevented when the temperature outside the enclosure is lower than that inside of the enclosure. More specifically, there is provided in an air conditioning system, a novel combination including a humidifier for supplying moisture to an enclosure, and two humidity regulators connected in series relation for controlling said humidifier, and one of which is adapted to render the other inoperative and is located in the enclosure on or immediately adjacent to a surface which is adapted to become chilled due to lower temperature outside of the enclosure, while the other is located in the enclosure at a point where the relative humidity of the enclosure is at a desired average, whereby said first regulator is actuated to render the second one inoperative to control the humidifier when the surface becomes chilled, thereby preventing condensation of moisture on said surface.

Although only one embodiment of the invention has been illustrated and described, various changes in the form and relative arrangement of the parts, which will now appear to those skilled in the art, may be made without departing from the scope of the invention. The system can be applied to all manner of humidifying or air-conditioning apparatus no matter what type the actual humidity controls or humidifiers may be. Reference is, therefore, to be had to the appended claims for a definition of the limits of the invention.

What is claimed is:

1. In an air conditioning system, an electrically controlled humidifier, a humidity actuated regulator electrically connected to said humidifier for controlling the latter in response to one condition of relative humidity, and a second humidity actuated regulator electrically connected in series with said humidifier and said first regulator to render the latter inoperative in response to another condition of relative humidity.

2. In an air conditioning system, a humidifier, a humidity actuated regulator connected to said humidifier and set to control the latter to maintain the relative humidity at a desired average, and a second humidity actuated regulator connected in series relation with said humidifier and first regulator and set to respond to a higher relative humidity than the first regulator to render the latter inoperative.

3. In an air conditioning system, an electrically controlled humidifier for supplying humidified air to an enclosure, a humidity actuated regulator electrically connected to said humidifier and located at a point of average temperature in said enclosure and set to control said humidifier to maintain the relative humidity at a desired value, and a second humidity actuated regulator electrically connected in series relation with said humidifier and said first regulator and located in said enclosure adjacent to a surface which is adapted to become chilled and set to respond to a higher relative humidity than said first regulator for rendering the latter inoperative when said surface becomes chilled whereby condensation of moisture on said surface due to such chilling is prevented.

4. In combination, a humidifier for supplying moisture to air to be supplied to an enclosure, a humidity actuated regulator located in said enclosure at a point of average humidity, and a second humidity actuated regulator located in said enclosure adjacent a surface adapted to become chilled due to low temperatures outside of said enclosure, said humidifier and said two regulators being electrically connected in series whereby said first regulator is rendered ineffective to control said humidifier when said second regulator is actuated upon increase of humidity at the chilled surface beyond a predetermined value, thereby preventing condensation on said chilled surface.

RALPH R. CHAPPELL.
DENIS McCORMACK.
RUTGER B. COLT.